Figure 1:
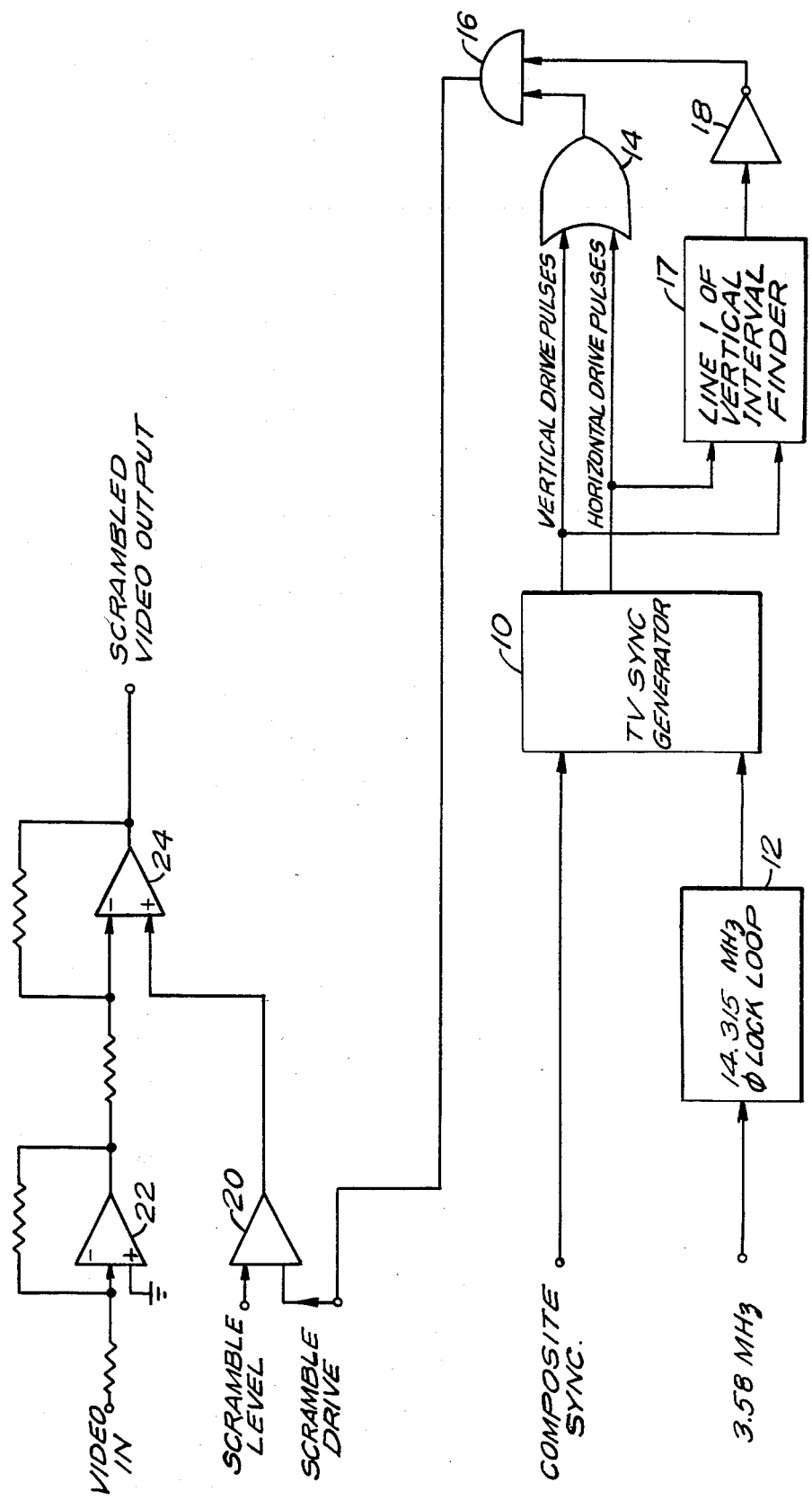

United States Patent [19]

Glaab

[11] Patent Number: 4,562,465

[45] Date of Patent: Dec. 31, 1985

[54] ADAPTIVE VIDEO DESCRAMBLING SYSTEM

[75] Inventor: Joseph B. Glaab, New Hope, Pa.

[73] Assignee: General Instrument Corporation, New York, N.Y.

[21] Appl. No.: 504,177

[22] Filed: Jun. 14, 1983

[51] Int. Cl.[4] ............................................. H04N 7/167
[52] U.S. Cl. ..................................... 358/120; 358/114
[58] Field of Search ............... 358/114, 120, 122, 123, 358/124

[56] References Cited

U.S. PATENT DOCUMENTS

| | | | |
|---|---|---|---|
| 3,530,232 | 9/1970 | Reiter et al. | 358/120 |
| 4,075,660 | 2/1978 | Horowitz | 358/124 |
| 4,222,068 | 9/1980 | Thompson | 358/120 |

Primary Examiner—S. C. Buczinski
Assistant Examiner—Melissa L. Koltak
Attorney, Agent, or Firm—Hopgood, Calimafde, Kalil, Blaustein & Judlowe

[57] ABSTRACT

A television signal is scrambled by suppressing horizontal and vertical synchronizing signals while leaving unsuppressed a reference level during a selected reference interval. Descrambling of the received scrambled signal is achieved by comparing the unsuppressed reference level with the suppressed synchronizing signals and by adding a level representative of that comparison to the suppressed synchronizing signals, thereby to restore the latter to their proper levels.

18 Claims, 4 Drawing Figures

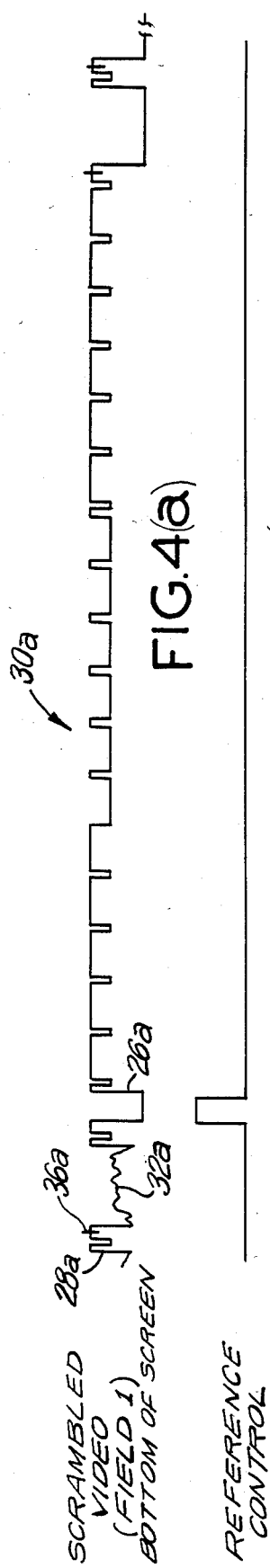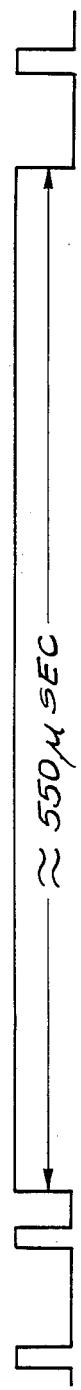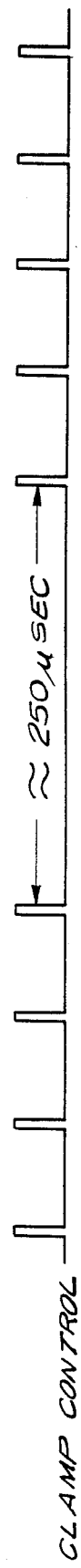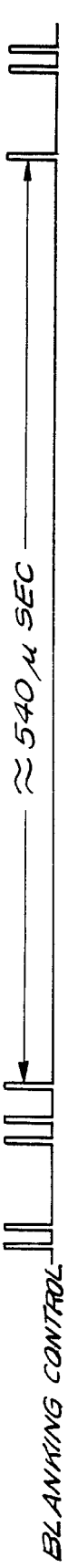
FIG.4(a) SCRAMBLED VIDEO (FIELD 1) BOTTOM OF SCREEN
FIG.4(b) REFERENCE CONTROL
FIG.4(c) DESCRAMBLE CONTROL ≈ 550 μ SEC
FIG.4(d) CLAMP CONTROL ≈ 250 μ SEC
FIG.4(e) BLANKING CONTROL ≈ 540 μ SEC

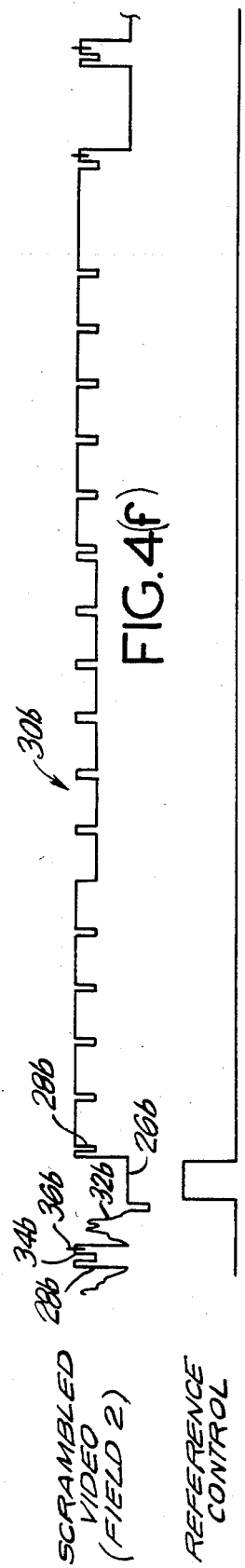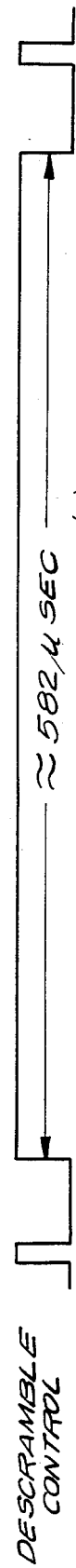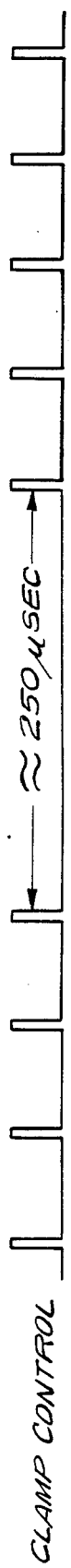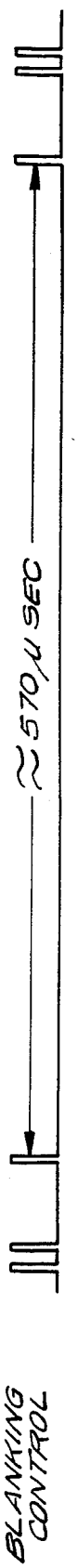

ADAPTIVE VIDEO DESCRAMBLING SYSTEM

The present invention relates generally to television receiving systems, and more particularly to a television descrambling system for use in the reception of a scrambled television signal.

In a typical subscription television system means are provided to encode the transmitted signal so that unauthorized viewers, that is viewers who do not pay to receive the subscription programming, are not able to view the transmitted signals on their television receivers. Authorized viewers are provided with means at their receivers to decode or descramble the received scrambled signal.

Many scrambling and descrambling techniques have been developed and implemented for use in subscription television systems. In one conventional scrambling technique the horizontal and vertical synchronizing pulses are suppressed to a level below that of the video such that the receiver tries to lock on to peaks in the video signal, which creates an unviewable picture at the television receiver. The synchronizing pulses are reconstructed at the receiver to descramble the received signal, thereby allowing the received television signal to be viewed.

One type of sync-suppression scrambling technique involves the attenuation of the vertical and horizontal synchronizing pulse by a known amount. At the receiver, the signal is descrambled by attenuating the video signal by the same amount. In another known variation of sync-suppression scrambling, as described in U.S. Pat. No. 4,222,068, a dc voltage is added to the synchronizing pulses of the baseband video to lower the synchronization pulses below the level of the video. At the receiver, a dc voltage is subtracted from the video to restore the proper relationship between the synchronization signals and the video.

In recent years an increasing number of television signals have been transmitted from a ground station up to a geostationary satellite orbiting around the earth, from which the signals are transmitted back to the earth where they can be received at television receivers equipped with a suitable antenna, or at the headend of a cable transmission system from where the signals are retransmitted to the cable system's subscribers.

In satellite television transmission, because of the low signal-to-noise ratio required to achieve satisfactory operation, the video portion of the television signal is frequency-modulated onto the rf carrier rather than being amplitude-modulated as in non-satellite television transmission. Moreover, in order to avoid interference with aircraft and other terrestial rf communication systems, the satellite carrier frequency is often swept or varied to effect energy dispersal of the satellite signal.

As in nonsatellite subscription television communication, in order to prevent an unauthorized individual from receiving signals directly from the satellite, such as by the acquisition of a suitable antenna, it is necessary to scramble the signal transmitted to the satellite. However, although the conventional television scrambling/descrambling techniques, as described above, are effective when used in nonsatellite, amplitude-modulated television transmission, they cannot be utilized to provide scrambling in a satellite system in a reliable and economical manner for several reasons, including the difficulty in accurately and consistently determining the percent modulation of an f.m. carrier. As a result, the conventional scrambling techniques cannot be reliably and economically employed in a television satellite transmission system. In other known scrambling systems in which sync information is suppressed, a signal indicating the amount of such suppression is transmitted along with the scrambled television signal. The former signal is utilized at the receiver to increase the sync signals by the amount they were suppressed. This system can, however, be foiled by simply determining the amount of sync suppression and restoring the received signal by that amount.

There thus exists the need for an effective system for use in transmitting scrambled television signals over a satellite transmission link in a manner that also effectively prevents the scrambling scheme from being readily defeated or foiled by "pirates" who seek to view an unscrambled television signal without paying the required subscription fee to the originator of the satellite television broadcast.

It is an object of the present invention to provide a television descrambling system which can be reliably employed in a satellite television transmission system.

It is a further object of the present invention to provide a television descrambling system of the type described, which is difficult to foil.

It is still another object of the invention to provide a television descrambling system of the type described, which compensates for the slow frequency shifts employed in f.m. satellite television transmission.

In the operation of the descrambling system of the invention, selected portions of the horizontal and vertical synchronizing signals are suppressed and a reference signal, such as the level for black, is transmitted during a preset reference interval at an unsuppressed or true level. The received scrambled television signal is applied to a comparison loop in which the reference level is compared with the suppressed synchronizing signal levels to produce an "error" signal that represents the amount by which the synchronizing signals were suppressed. The error signal is added to the baseband video, thereby to restore the suppressed synchronizing signals to their proper levels to enable the reception of a descrambled television picture.

Figure 3:
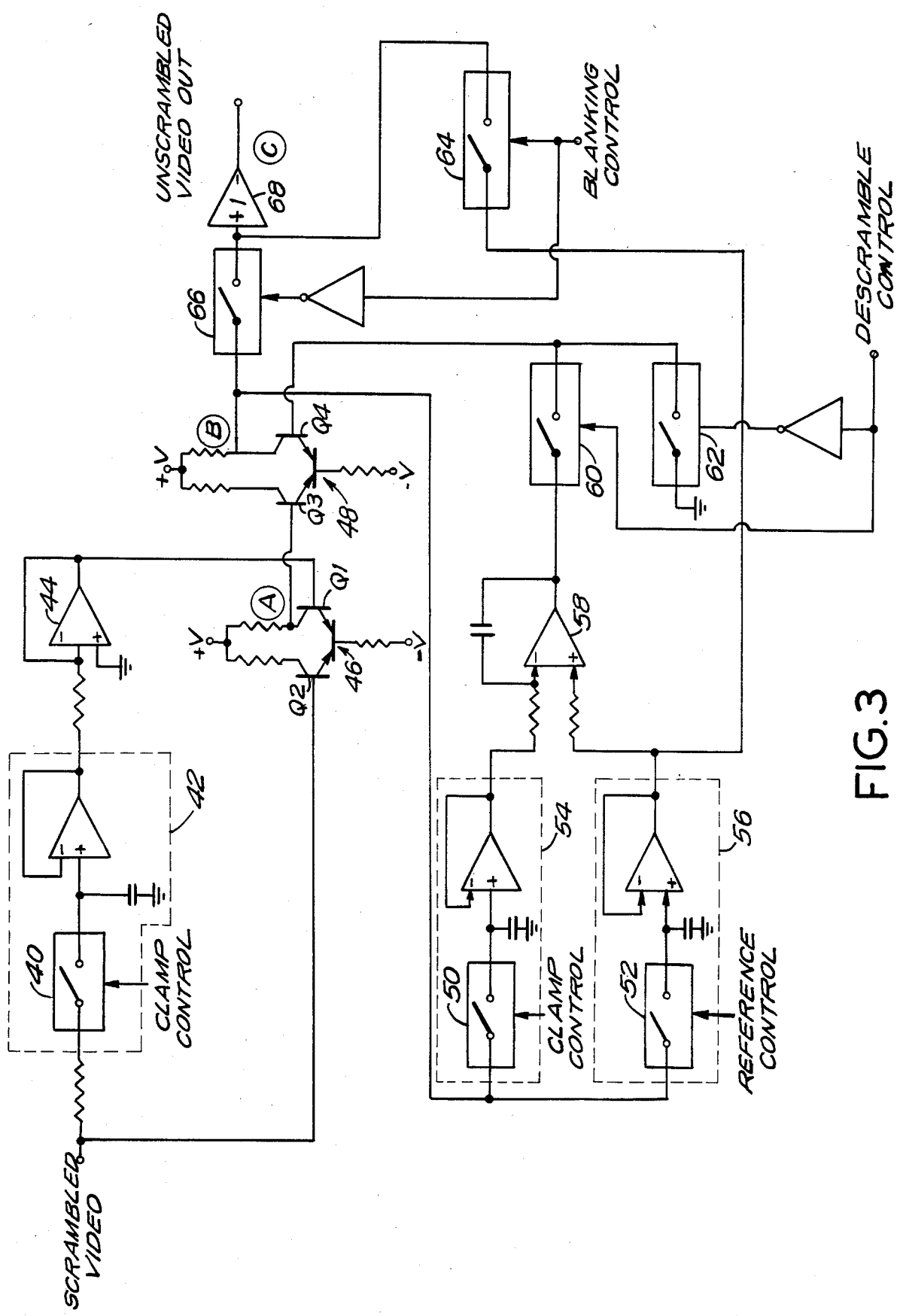

To the accomplishment of the above and such further objects as may hereinafter appear, the present invention relates to a television descrambling system substantially as defined in the appended claims, and as described in the following detailed specification as considered in conjunction with the accompanying drawings, in which:

FIG. 1 is a schematic block diagram of a scrambler for producing a scrambled television signal for use with the descrambler of the invention;

FIGS. 2(a)–2(h) illustrate waveforms of signals in fields 1 and 2 for use in explaining the operation of the scrambler of FIG. 1;

FIG. 3 is a schematic block diagram of a descrambler circuit in accordance with an embodiment of the invention; and FIGS. 4(a)–4(j) illustrate waveforms for use in describing the operation of the descrambler circuit of FIG. 3.

The descrambling system of the invention decodes a television signal in which the synchronizing pulses are suppressed by a preset but arbitrary voltage level to a level below that of the video. This causes the television receiver to attempt to synchronize to random video peaks rather than to the synchronization signals, which would lead to a scrambled reception. The transmitted scrambled signal also includes an unsuppressed reference level which, as described below, is used to restore the suppressed synchronizing pulses to their proper level, thereby to reconstitute a television signal which can be viewed in an unscrambled form.

FIG. 1 schematically illustrates a system for producing the encoded television signal, and FIGS. 2(a)-2(h) illustrate waveforms of signals developed or employed in that system. Referring to FIG. 1 a composite sync signal is applied to one input of a sync generator 10. A 3.58 mHz signal is applied to a 14.318 mHz phase-lock loop 12, which phase locks to a multiple (here 4) of the input 3.58 mHz signal. The output of phase-lock loop 12 is applied to the other input of sync generator 10.

Sync generator 10 produces at its output the vertical drive pulses and the horizontal drive pulses, which are applied to the inputs of an OR gate 14, the output of which is, in turn, applied to one input of an AND gate 16. The vertical and horizontal drive pulses are also applied to the inputs of a vertical interval line finder 17, which counts the vertical lines and produces an output at a predetermined line number or numbers or fraction of a predetermined line at which it is desired to inhibit the suppression of the synchronizing intervals, so that scrambling can be inhibited when desired, such as, for example, during one-half of line 1 of each vertical blanking interval.

The output of the vertical interval line finder (FIGS. 2(b) and 2(f)) is applied to an inverter 18, the output of which is, in turn, applied to the other input of AND gate 16. The output of AND gate 16 (FIGS. 2(c) and 2(g)) is the scramble control or drive signal in which, as shown, the high level determines which portion of the input signal (FIG. 2(a) for field 1 and FIG. 2(e) for field 2) will be suppressed.

The scramble control signal is applied to one input of a gated amplifier 20, which receives at its other input a scramble level signal, which, may be a dc voltage of any arbitrary value typically sufficient to reduce the horizontal and vertical blanking interval between 1 db and 9 db. If desired, the level of the scramble level signal may vary either continuously or intermittently between these values. The output of amplifier 20 is thus a signal having the waveform of the scramble control signal (FIGS. 2(c) and 2(g)) with an amplitude proportional to the scramble level analog voltage signal.

Figure 2:
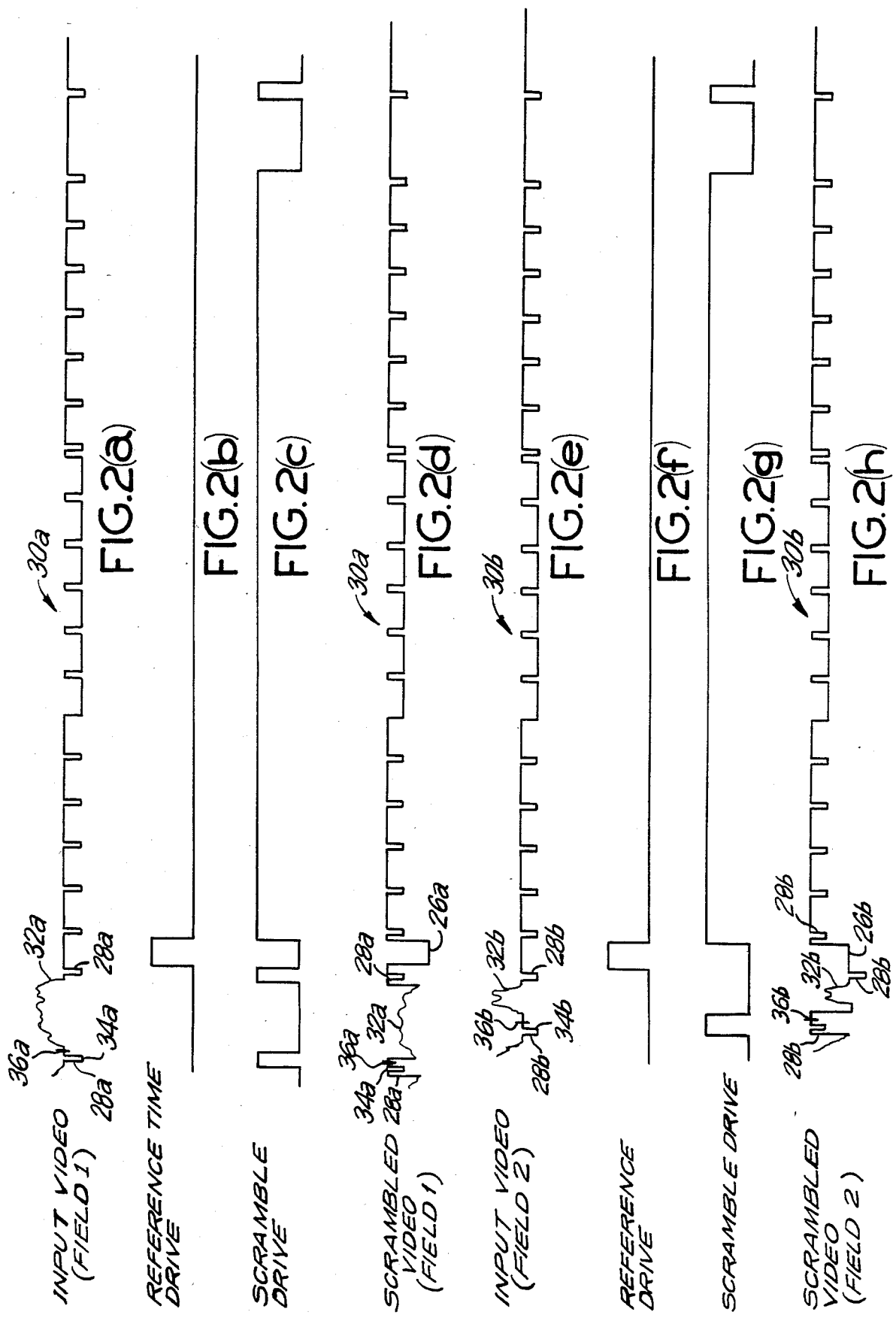

The television signal which is to be scrambled (FIG. 2(a) for field 1 and FIG. 2(e) for field 2) is amplified and inverted in an amplifier 22, the output of which is applied to the negative input of an offset-introducing inverting amplifier 24, the positive input of which receives the output of gated amplifier 20. Amplifier 24 effectively combines the two inputs so as to suppress those portions of the input video signals which occur at the times of the high-level portions of the scramble control signal, thereby to produce at the output of amplifier 24 the scrambled video output signal. As shown in FIG. 2, in the scrambled output signal (FIG. 2(d) for field 1 and FIG. 2(h) for field 2) the horizontal and vertical blanking intervals are suppressed except at a reference interval corresponding to the high level of the reference time drive. That reference, as described in greater detail below with reference to the descrambler circuit, serves as a reference level signal during the decoding or descrambling of the received scrambled signal. Thus, in the scrambled video signals for fields 1 and 2, shown respectively in FIGS. 2(d) and 2(h), as respectively compared to the unscrambled video signals in FIGS. 2(a) and 2(d), the horizontal intervals 28a and 28b and the vertical intervals 30a and 30b are suppressed relative to the video portions 32a and 32b, except at the reference or "black" levels 26a and 26b. As is conventional, the horizontal interval includes horizontal sync pulses 34a and 34b.

The scrambled field 1 and field 2 video signals are then combined in a known manner with an f.m. carrier and transmitted, such as over a satellite communication system with energy dispersal, to a television receiver, where the demodulated or baseband scrambled video is unscrambled in the descrambler circuit of the invention, an embodiment of which is illustrated in FIG. 3, in which the suppressed portions of the horizontal and vertical intervals are restored. Since the descrambling circuit of FIG. 3 operates in the same manner to restore both the field 1 and field 2 scrambled signals, the operation of that circuit is described only with respect to its operation on field 1, although FIG. 4 illustrates waveforms of signals involved in descrambling both field 1 and field 2 signals.

As shown in FIG. 3, the descrambling circuit includes several analog switches, such as an analog switch 40. Those switches which may, for example, be in the form of CMOS gate arrays are shown schematically as including an input terminal, an output terminal, and a control terminal. In the operation of this type of switch, when a control signal or pulse is applied to the control terminal, the signal on the input terminal is conducted to the output terminal for the period of the control signal. Thus, when the clamp control signal (FIG. 4(d)) is applied to the control terminal of switch 40, the scrambled video signal is transferred to the output terminal of that switch.

The output of switch 40 is applied to a sample-and-hold circuit 42, the output of which is applied to one input of a differential-comparator amplifier 44, the other input of which is connected to a reference potential, here ground. The output of amplifier 44 is applied to the base of a transistor Q1 which, together with a transistor Q2, constitutes a level shifter 46. The emitters of transistor Q1 and Q2 are connected to one another and through a resistor to a negative supply voltage $-V$. The collectors of the transistors Q1 and Q2 are connected to a positive supply voltage $+V$ through a pair of resistors. The input scrambled video signal is also applied to the base of transistor Q2.

The collector of transistor Q1, which defines a node A, is connected to the base of a transistor Q3, which with transistor Q4, constitutes a second level shifter 48. The emitters of transistors Q3 and Q4 are connected to one another and to a negative voltage supply $-V$ through a resistor, and the collectors are connected through resistors to the positive voltage supply $+V$. The collector of transistor Q4, which defines a node B, is connected to the input terminals of analog switches 50 and 52. The control terminal of switch 50 receives the clamp control signal and the output terminal of switch 50 is connected to a sample-and-hold circuit 54. Similarly, the control terminal of witch 52 receives the reference control signal (FIG. 4(b)) and its output is connected to a sample-and-hold circuit 56.

The outputs of sample-and-hold circuits 54 and 56 are applied through resistors to the inputs of an integrating amplifier 58, the output of which is applied to the input of an analog switch 60. The control terminal of switch 60 receives the descramble control signal (FIG. 4(c) and its output terminal is connected to the base of transistor Q4. Level shifter 48, sample-and-hold circuits 54 and 56, and integrator amplifier 58 are thus connected to form a feedback loop. The output of switch 60 is also connected to the output of an analog switch 62, the input of which is connected to ground; the control terminal of switch 62 receives an inverted descramble control signal.

The output of sample-and-hold circuit 56 is also applied to the input terminal of an analog switch 64, which receives a blanking control signal (FIG. 4(e)) at its control terminal. Node B is connected to the input terminal of an analog switch 66, which receives an inverted blanking control signal at its control terminal. The outputs of switches 64 and 66 are combined at the input of unity-gain amplifier 68, the output of which is the desired unscrambled video in which the horizontal and vertical synchronizing intervals are restored to their proper levels.

The various control signals of FIGS. 4(b)–4(e) (and 4(g) to 4(j), for field 2) are produced by a video timing generator, various forms which are known to those skilled in the art. One technique for realizing such a video timing generator, based on the detection of the color burst signal, is similar to the basic approach describe in a copending application Ser. No. 502,933 filed June 10, 1983 assigned to the assignee of the present application. The reference control signal (FIGS. 4(b) and 4(g)) is produced during the reference or black interval 26 at half of the visible line of line 1; the descramble control signal (FIGS. 4(c) and 4(h)) occurs at the time of the horizontal and vertical intervals; the clamp control signal (FIGS. 4(d) and 4(i)) is produced at the occurrence of the back porch of each horizontal interval; and the blanking control signals (FIGS. 4(e) and 4(j)) occur immediatedly preceding and following the descramble control signal.

The operation of the circuit of FIG. 3 under the control of the timing and control signals of FIG. 4 can now be explained. The input scrambled video signal is sampled in sample-and-hold circuit 42 during the period of each clamp control signal, that is, at the color burst time of every line that has a color burst, which causes switch 40 to conduct. The sampled scrambled video level is applied to one input of differential amplifier 44, which compares the sampled level to the ground reference to which the other input of amplifier 44 is connected.

The output of amplifier 44 is applied to one input of level shifter 46 at the base of transistor Q1. Since the input scrambled video is also applied to the other input of level shifter 46 at the base of transistor Q2, the level of the signal at node A is shifted to ensure that the reference or black "back porch" level is at ground level, so as to overcome the effects of the energy dispersal employed in the satellite transmission which could cause the reference level to shift above or below the ground reference level.

The signal at node A is applied to the second level shifter 48, where the signal is again inverted and amplified and applied to analog switches 50 and 52. The latter is turned "on" once each vertical interval during the reference interval, whereas the former is turned "on" during the clamping interval. The outputs of both switches 50 and 52 are integrated in sample-and-hold circuits 56 and 54, respectively, and these signals, which represent respectively the unsuppressed reference level and supressed synchronizing level, are compared in amplifier 58 to produce an "error" signal proportional to the difference between the suppressed synchronizing level and the unsuppressed reference level and thus to the amount of suppression introduced in the horizontal and vertical intervals of the scrambled video signal.

That "error" DC level is passed through switch 60 during the descramble period, that is, during only the horizontal and vertical suppression intervals, to the base of transistor Q4 where the DC level is summed with the recovered baseband signal so that the synchronizing level at node B tends to be restored by an amount proportional to the "error" signal. Since the level-shifter video amplifier 48 is part of a control loop, along with sample-and-hold circuits 54 and 56 and comparator-amplifier 58, the "error" signal developed at comparator-amplifier 58 tends to decrease in each successive sampling period toward zero until the suppressed horizontal and vertical intervals are restored to their desired unsuppressed levels. The signal at node B is further filtered by being passed through switch 66 except during the blanking control interval to remove extraneous signals, thereby to produce at output node C a filtered restored television signal in which the vertical and horizontal synchronizing pulses are restored to their proper levels.

It will thus be appreciated from the foregoing description of one embodiment of the invention that a video descrambling system has been provided which is capable of descrambling signals transmitted from a satellite and which permits the absolute level of suppression of the synchronizing pulses to be continuously changed by up to 8 db so as to foil any would-be "pirate" who may attempt to override the descrambling signal in an unauthorized manner.

It will also be appreciated that whereas the present invention has been hereinabove described with reference to a presently preferred embodiment, modifications may be made therein without necessarily departing from the spirit and scope of the invention.

What is claimed is:

1. A television decoder for descrambling a scrambled video signal in which the synchronizing signals are suppressed and which includes an unsuppressed reference level occurring during a preset reference interval, said decoder comprising an input terminal for receiving the scrambled video signal, first means operatively connected to said input terminal for detecting the level of the suppressed synchronizing signal, second means operatively connected to said input terminal for detecting the unsuppressed reference level, means operatively connected to said first and second level detecting means for operatively comparing the suppressed synchronizing level and said unsuppressed reference level and for producing an error signal having an amplitude proportional to the difference between the suppressed synchronizing level and said unsuppressed reference level, and means operatively connected to the output of said comparing means for applying said error signal to a second level establishing means in advance of said first detecting means, thereby to modify by an amount based on the amplitude of said error signal the level of the suppressed synchronizing signals.

2. The decoder of claim 1, wherein said first detecting means comprises first means for sampling the scrambled television signal at the synchronizing portion thereof, and said second detecting means includes second means for sampling the scrambled television signal during the reference interval.

3. The decoder of claim 2, further comprising first and second signal-storing means respectively operatively connected to the outputs of said first and second sampling means.

4. The decoder of claim 3, wherein said level establishing means comprises means operatively connected to said input terminal for establishing a preset level for said reference level.

5. The decoder of claim 4, in which said preset level-establishing means comprises a first level-shifting means.

6. The decoder of claim 5 in which said preset level establishing means further comprises third means connected to said input terminal for sampling the level of the suppressed synchronizing signal and for storing a signal representative of the suppressed synchronizing signal, and a reference comparison means having one input connected to the output of said third sampling means and a second input connected to said preset level.

7. The decoder of claim 6 in which said preset level is ground.

8. The decoder of claim 6, in which said first level-shifting means includes a first input operatively connected to said input terminal for receiving the scrambled video signal thereat, and a second input operatively connected to the output of said reference comparison means, whereby the output of said first level-shifing means is a scrambled video signal in which the reference level is clamped to said preset level.

9. The decoder of claim 5, in which said level-establishing means includes second level-shifting means having one input operatively connected to the output of said first level-shifting means and a second input operatively connected to the output of said comparing means.

10. The decoder of claim 9, in which said second level-shifting means has a first input operatively connected to the output of said first level-shifting means and a second input connected to the output of said comparing means, whereby the output of said comparing means is operatively added to the scrambled video signal at the second input of said second level-shifting means and the signal at the output of said second level-shifting means is a descrambled video signal in which the synchronizing levels are restored toward an unsuppressed level.

11. In combination with the decoder of claim 1, an encoder for scrambling a television signal having suppressed synchronizing signals and an unsuppressed reference level during a reference interval, said encoder comprising a video input terminal, means for providing synchronizing signals, means for providing a scramble inhibit signal during a reference interval, first means for combining said scramble inhibit signal and said synchronizing signals to produce a scramble drive signal at a first level during periods at which it is desired to suppress a television signal and at a second level at which suppression is to be inhibited, second means for combining the scramble drive signal and a scramble level signal to produce a selective suppression signal corresponding to the periods of said first level of said scramble drive signal, and third means for combining an unscrambled video signal and the selective suppression signal, thereby to scramble the video signal by selectively suppressing selected portions of the video signal corresponding to those intervals at which the scramble drive signal is at its said first level.

12. The decoder of claim 1, further comprising means operatively connected to said input terminal for establishing a preset level for said reference level.

13. The decoder of claim 12, in which said preset level-establishing means comprises a first-level-shifting means.

14. The decoder of claim 13, in which said preset level establishing means further comprises means connected to said input terminal for sampling the level of the suppressed synchronizing signal and for storing a signal representative of the suppressed synchronizing signal, and a reference comparison means having one input connected to the output of said sampling means and a second input connected to said preset level.

15. The decoder of claim 14 in which said preset level is ground.

16. The decoder of claim 15, in which said first level-shifting means includes a first input operatively connected to said input terminal for receiving the scrambled video signal thereat, and a second input operatively connected to the output of said reference comparison means, whereby the output of said first level-shifting means is a scrambled video signal in which the reference level is clamped to said preset level.

17. The decoder of claim 16, in which said level-modifying means includes second level-shifting means having one input operatively connected to the output of said first level-shifting means and a second input operatively connected to the output of said comparing means.

18. The decoder of claim 17, in which said second level-shifting means has a first input operatively connected to the output of said first level-shifting means and a second input connected to the output of said comparing means, whereby the output of said comparing means is operatively added to the scrambled video signal at the second input of said second level-shifting means and the signal at the output of said second level-shifting means is a descrambled video signal in which the synchronizing levels are restored toward an unsuppressed level.

* * * * *